(12) United States Patent
Fainstein et al.

(10) Patent No.: US 8,950,008 B2
(45) Date of Patent: Feb. 3, 2015

(54) UNDISCOVERABLE PHYSICAL CHIP IDENTIFICATION

(75) Inventors: Daniel Jacob Fainstein, Hopewell Junction, NY (US); Chandrasekharan Kothandaraman, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 13/561,185

(22) Filed: Jul. 30, 2012

(65) Prior Publication Data

US 2014/0033330 A1    Jan. 30, 2014

(51) Int. Cl.
*H03K 5/24* (2006.01)
*G06F 21/00* (2013.01)
*H02H 3/24* (2006.01)

(52) U.S. Cl.
CPC . *G06F 21/00* (2013.01); *H02H 3/24* (2013.01)
USPC ............................................. 726/30; 327/74

(58) Field of Classification Search
CPC . H03K 17/04104; H03K 3/011; H03K 3/283; H03K 4/501; H03K 5/24; H02H 3/24; H01S 4/00; G05F 3/16; G06F 7/04; G06F 21/00
USPC ........................................ 726/10, 30; 327/74
See application file for complete search history.

(56) References Cited

U.S. PATENT DOCUMENTS

| | | | |
|---|---|---|---|
| 5,581,505 A | 12/1996 | Lee | |
| 2006/0227477 A1* | 10/2006 | Sheng et al. | 361/92 |
| 2009/0115548 A1 | 5/2009 | Hamada et al. | |
| 2009/0243792 A1* | 10/2009 | Chmelar | 340/5.6 |
| 2010/0219804 A1* | 9/2010 | Thorp | 323/313 |
| 2012/0030268 A1 | 2/2012 | Liu et al. | |
| 2012/0132808 A1* | 5/2012 | Yamamura | 250/338.3 |

FOREIGN PATENT DOCUMENTS

| | | |
|---|---|---|
| EP | 1158537 A2 | 11/2001 |
| WO | WO0049538 A1 | 8/2000 |

OTHER PUBLICATIONS

N. Robson et al; Electrically programmable fuse (eFUSE) from memory redundancy to autonomic chips; IEEE, Custom Integrated Circuits Conference, 2007; pp. 799-804.

* cited by examiner

*Primary Examiner* — Jeffrey Pwu
*Assistant Examiner* — Samuel Ambaye
(74) *Attorney, Agent, or Firm* — Joseph P. Abate; Howard M. Cohn

(57) ABSTRACT

Methods and circuits for undiscoverable physical chip identification are disclosed. Embodiments of the present invention provide an intrinsic bit element that comprises two transistors. The two transistors form a pair in which one transistor has a wide variability in threshold voltage and the other transistor has a narrow variability in threshold voltage. The wide variability is achieved by making a transistor with a smaller width and length than the other transistor in the pair. The variation of the threshold voltage of the wide variability transistor means that in the case of copies of intrinsic bit elements being made, some of the "copied" wide variability transistors will have significantly different threshold voltages, causing some of the intrinsic bit elements of a copied chip to read differently than in the original chip from which they were copied.

10 Claims, 5 Drawing Sheets

UNDISCOVERABLE PHYSICAL CHIP IDENTIFICATION

FIELD OF THE INVENTION

The present invention relates generally to semiconductors, and more particularly, to a method and circuit for implementing undiscoverable physical chip identification.

BACKGROUND OF THE INVENTION

Counterfeit electronic components have become a serious concern in recent years. Counterfeit electronic components can jeopardize the performance and reliability of the products in which they are used. Counterfeit component detection, as well as other applications, such as data security and encryption, may employ the use of chip identification in the form of a physical unclonable function (PUF). A PUF is a function that is embodied in a physical structure and is easy to evaluate but hard to predict. Ideally, an individual PUF device must be easy to make but practically impossible to duplicate, even given the exact manufacturing process that produced it. As there is an ever-increasing need for data security and authentication, it is desirable to have improved methods and circuits for implementing chip identification.

SUMMARY OF THE INVENTION

In one embodiment of the present invention, an electronic circuit is provided. The electronic circuit comprises a first transistor having a first threshold voltage variability, and a second transistor having a second threshold voltage variability. The first transistor comprises a first endpoint node connected to a first voltage and a second endpoint node connected to a second voltage. The second transistor comprises a first endpoint node connected to the first voltage and a second endpoint node connected to the second voltage. An enable signal is configured and disposed to control a gate of the first transistor and a gate of the second transistor. A difference detection circuit is disposed between the first endpoint node of the first transistor and the first endpoint node of the second transistor, and the difference detection circuit is configured and disposed to generate a signal indicative of a difference in threshold voltage between the first transistor and the second transistor.

In another embodiment of the present invention, an integrated circuit is provided. The integrated circuit comprises a plurality of intrinsic bit elements, wherein each intrinsic bit element of the plurality of intrinsic bit elements comprises a first transistor having a first threshold voltage variability, a second transistor having a second threshold voltage variability, wherein the first transistor comprises a first endpoint node connected to a first voltage and a second endpoint node connected to a second voltage, and the second transistor comprises a first endpoint node connected to the first voltage and a second endpoint node connected to the second voltage, an enable signal configured and disposed to control a gate of the first transistor and a gate of the second transistor. A difference detection circuit is disposed between the first endpoint node of the first transistor and the first endpoint node of the second transistor, and the difference detection circuit is configured and disposed to generate a signal indicative of a difference in threshold voltage between the first transistor and the second transistor.

In another embodiment of the present invention, a method of generating a unique number within a chip is provided. The method comprises configuring a plurality of intrinsic bit elements within a chip, wherein each intrinsic bit element is configured to generate a bit value, and generating a data value string comprised of data from the plurality of intrinsic bit elements.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting.

Certain elements in some of the figures may be omitted, or illustrated not-to-scale, for illustrative clarity. In some cases, in particular pertaining to signals, a signal name may be oriented very close to a signal line without a lead line to refer to a particular signal, for illustrative clarity.

Figure 1:
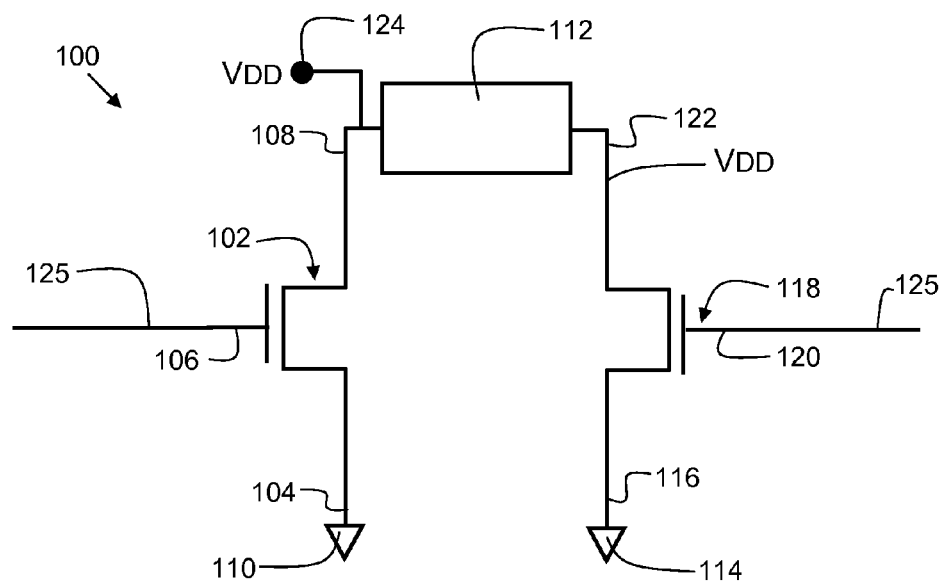

Often, similar elements may be referred to by similar numbers in various figures (FIGs) of the drawing, in which case typically the last two significant digits may be the same, the most significant digit being the number of the drawing figure (FIG). Furthermore, for clarity, some reference numbers may be omitted in certain drawings.

FIG. 1 shows an embodiment of an intrinsic bit element.

Figure 2:
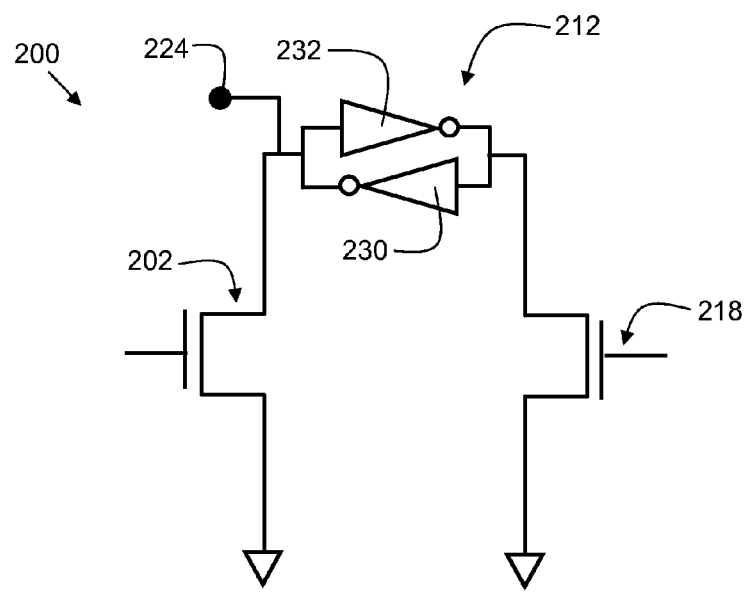

FIG. 2 shows an additional embodiment of an intrinsic bit element.

Figure 3:
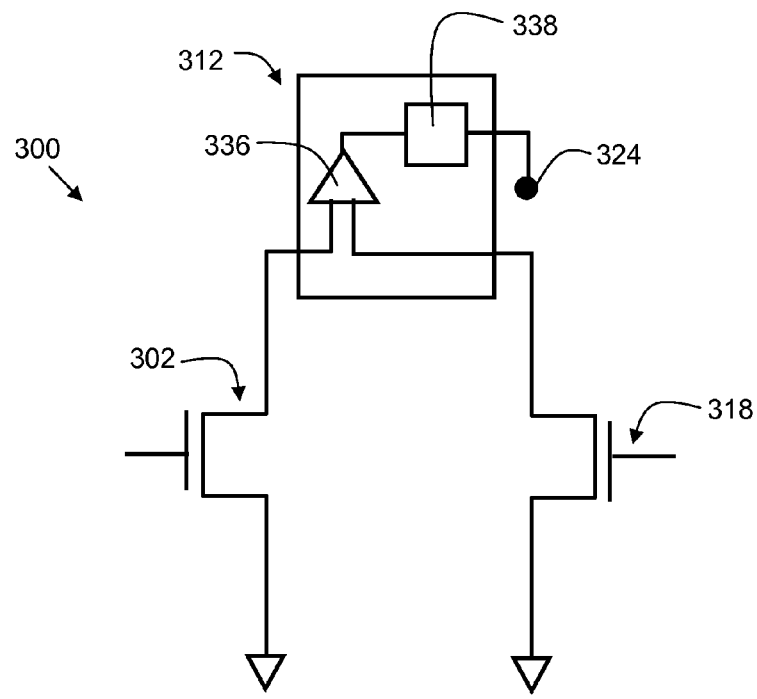

FIG. 3 shows another additional embodiment of an intrinsic bit element.

Figure 4:
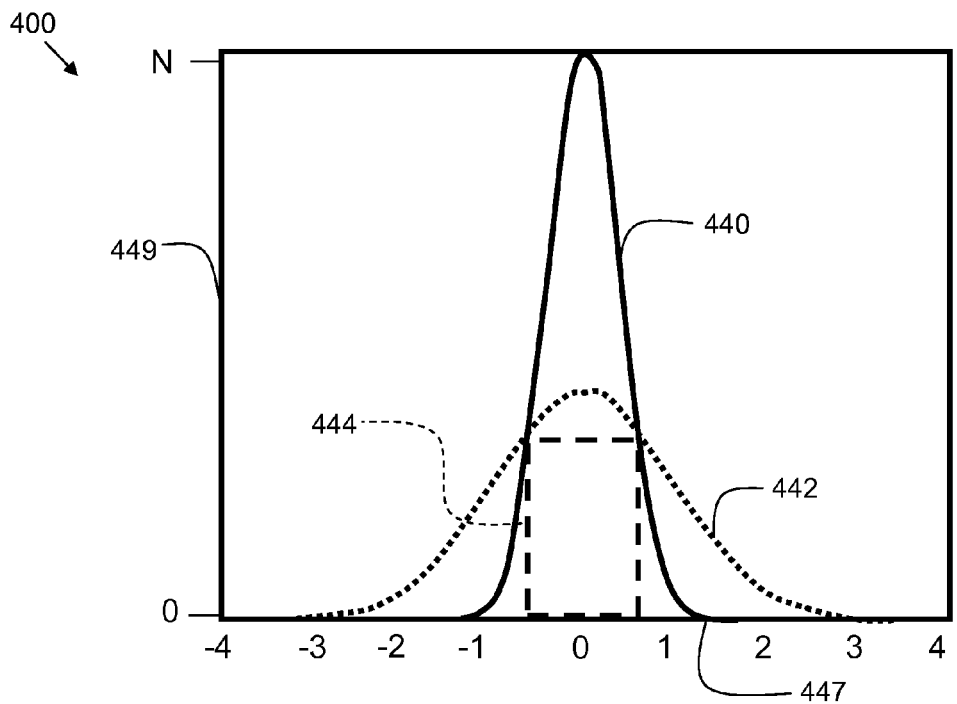

FIG. 4 is a chart comparing device variability.

Figure 5:
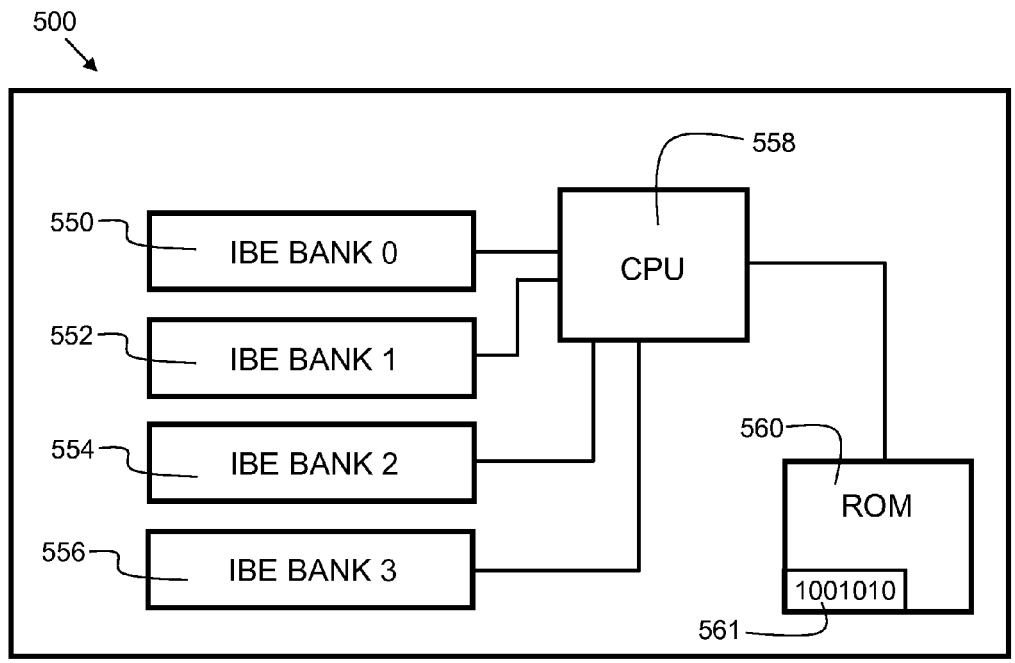

FIG. 5 is a block diagram of an integrated circuit incorporating intrinsic bit elements.

Figure 6:
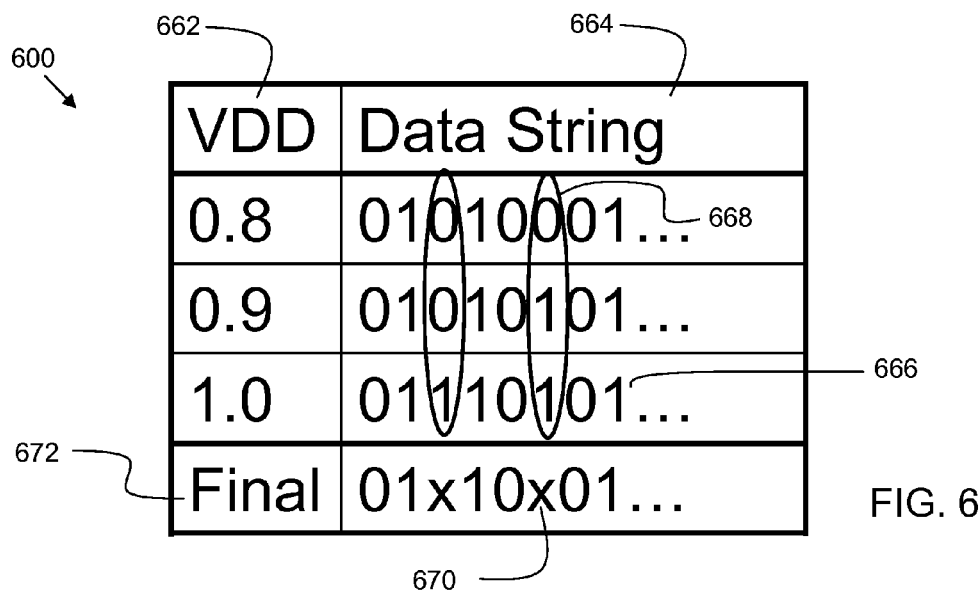

FIG. 6 is a table illustrating don't-care bits.

Figure 7:
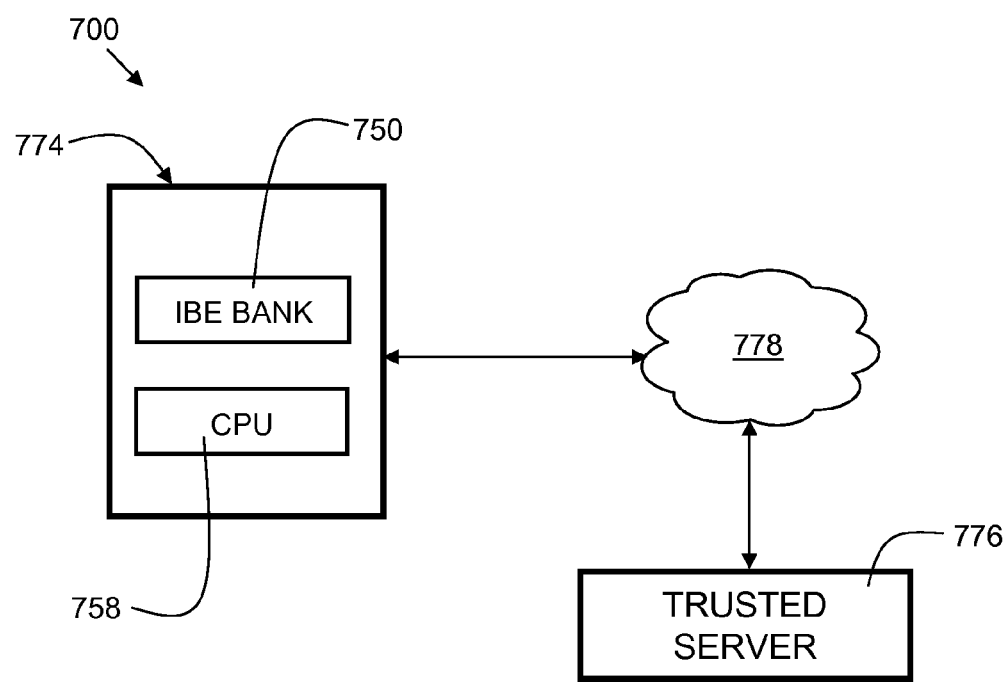

FIG. 7 is a block diagram of a system comprising a trusted server.

Figure 8:
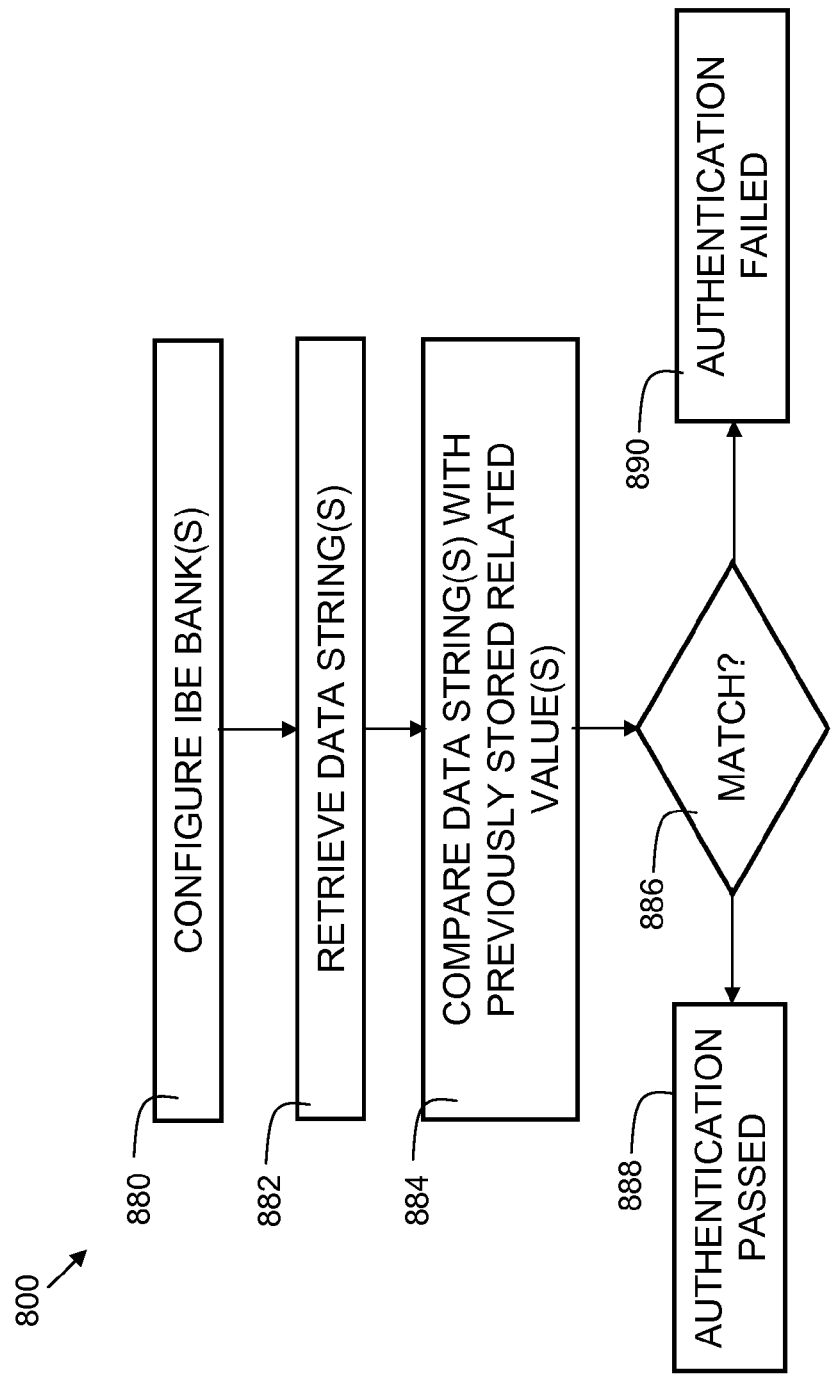

FIG. 8 is a flowchart indicating process steps for an embodiment of the present invention.

DETAILED DESCRIPTION

FIG. 1 shows an embodiment of an intrinsic bit element 100. Intrinsic bit element 100 comprises a first transistor 102. Transistor 102 comprises a gate 106, and a first endpoint node 104 and a second endpoint node 108. For the purposes of this disclosure, an endpoint node may be either a source or a drain of a transistor. The first endpoint node 108 of transistor 102 is connected to a first reference voltage (e.g. VDD). The second endpoint node 104 is connected to a second voltage (ground) 110. A second transistor 118 is configured in parallel with transistor 102. Transistor 118 comprises a gate 120, and a first endpoint node 122 and a second endpoint node 116. The first endpoint node 122 of transistor 118 is connected to a reference voltage (e.g. VDD). The second endpoint node 116 is connected to a reference voltage ground 114. A difference detection circuit 112 is disposed between the first endpoint node 108 of the first transistor 102 and the first endpoint node 122 of the second transistor 118. An enable signal 125 is connected to the gate 106 of the first transistor 102 and the gate 120 of the second transistor 118. A data node 124 is set either high or low (e.g. binary 1 or binary 0) depending on conditions intrinsic to transistors 102 and 118.

Transistor 102 has a larger variation in threshold voltage than transistor 118. For the purposes of this disclosure, transistor 102 is referred to as a wide variability Vt device, and transistor 118 is referred to as a narrow variability Vt device. In some embodiments, first transistor 102 has a threshold voltage standard deviation value that ranges from three to four times a threshold voltage standard deviation value of the second transistor 118. In some embodiments, transistor 102 has a channel width and length that are smaller than that of transistor 118. This creates increased variability in the voltage threshold for transistor 102 as compared with transistor 118, without necessitating modification of the fabrication process. In one embodiment, the ratio of channel width to channel length of the first transistor 102 is substantially equal to a ratio of channel width to channel length of the second transistor 118.

To operate the intrinsic bit element 100, enable signal 125 is asserted. This causes transistors 102 and 118 to tend to pull their respective first endpoint node to ground. Due to the induced variability between transistor 102 and transistor 118, one transistor or the other may "pull harder" to ground. The difference detection circuit 112 detects which transistor is pulling harder to ground and latches and outputs a signal on data node 124 which is indicative of which transistor had a greater strength (pulled harder to ground) after the enable signal 125 is de-asserted.

FIG. 2 shows an additional embodiment 200 of an intrinsic bit element. As stated previously, often, similar elements may be referred to by similar numbers in various figures (FIGs) of the drawing, in which case typically the last two significant digits may be the same, the most significant digit being the number of the drawing figure (FIG). For example, transistor 202 of FIG. 2 is similar to transistor 102 of FIG. 1.

In this embodiment, the difference detection circuit 212 comprises a cross-coupled inverter circuit. Difference detection circuit 212 is implemented via inverter 230 and inverter 232 arranged in a cross-coupled configuration. The cross coupled configuration will tend to output a signal on data node 224 which is indicative of which transistor had a greater strength (pulled harder to ground) after the enable signal 125 (FIG. 1) is de-asserted. The voltage threshold of a particular transistor affects which transistor has a greater strength. Hence, the variability in the wide variability Vt device causes some intrinsic bit elements to output a binary "1" and other intrinsic bit elements to output a binary "0."

FIG. 3 shows an additional embodiment 300 of an intrinsic bit element. In this embodiment, the difference detection circuit 312 comprises a comparator circuit. Difference detection circuit 312 is implemented via comparator 336 and latch 338 arranged to output a signal on data node 324 which is indicative of which transistor had a greater strength (pulled harder to ground) after the enable signal 125 (FIG. 1) is de-asserted.

FIG. 4 is a chart 400 comparing device variability. Chart 400 comprises curve 440 indicative of the standard deviation in threshold voltage for a narrow variability Vt device such as transistor 118 (FIG. 1). Chart 400 also comprises curve 442 indicative of the standard deviation in threshold voltage for a wide variability Vt device such as transistor 102 (FIG. 1). The horizontal axis 447 represents the number of standard deviations of the narrow variability Vt device. The vertical axis 449 represents an arbitrary number of device samples (N). As can be seen from chart 400, the curve 442 representing the wide variability Vt device has approximately three times the variability of the narrow variability Vt device represented by curve 440. Therefore, a subset of wide variability Vt devices have a threshold voltage that is significantly lower than that of a narrow variability Vt device, and another subset of wide variability Vt devices have a threshold voltage that is significantly higher than that of a narrow variability Vt device.

Region 444 denotes a range within chart 400 where the threshold voltage of the wide variability Vt device may be very close to the threshold voltage of a narrow variability Vt device. Intrinsic bit elements having a wide variability Vt device within region 444 may be unreliable. Hence, region 444 may be referred to as the "unreliable region" of chart 400. In some instances those intrinsic bit elements may read as a "1" and in other cases, those same intrinsic bit elements may read as a "0." Embodiments of the present invention address this unreliability.

FIG. 5 is a block diagram of an integrated circuit 500 incorporating intrinsic bit elements. Integrated circuit (IC) 500 comprises a plurality of intrinsic bit element (IBE) banks, indicated as 550, 552, 554, and 556. Each IBE bank is comprised of multiple intrinsic bit elements, such as illustrated in FIGS. 1-3. Each IBE bank may comprise one or more intrinsic bit elements. In one embodiment, each bank may comprise at least 64 intrinsic bit elements. Some embodiments may comprise between one thousand IBE to four thousand IBE per bank.

IC 500 comprises a central processing unit (CPU, "processor") 558 which may execute instructions stored in non-transitory read only memory (ROM) 560. The ROM 560 also may store a previously stored related value 561. The previously stored related value (PSRV) 561 may comprise data strings read from one or more of the IBE banks (550, 552, 554, 556). In another embodiment, the PSRV may be a data value based on a mathematical function to which the data strings read from one or more of the IBE banks (550, 552, 554, 556) is input. In some embodiments, the PSRV may be an encrypted form of the data strings read from one or more of the IBE banks (550, 552, 554, 556). In some embodiments, the PSRV may comprise data based on a one-way mathematical function, where the PSRV is based on the data strings read from one or more of the IBE banks (550, 552, 554, 556). The one-way mathematical function may be a hash function, such as MD5, or other suitable one-way mathematical function. The PSRV may be programmed at a factory as part of the chip fabrication process.

During authentication, the CPU 558 reads the data strings read from one or more of the IBE banks (550, 552, 554, 556). The IC 500 may comprise circuitry to implement registers, a scan chain, or other suitable means to allow data strings to be read from the IBE banks (550, 552, 554, 556). The CPU may then perform a data transformation, such as encryption, or application of a one-way mathematical function, to obtain a computed value. The computed value is compared with the PSRV 561, and if deemed to match, the chip is considered to be authenticated.

In other embodiments, the PSRV may be one or more of the data strings read from one or more of the IBE banks (550, 552, 554, 556). In this case, authentication is a comparison between one or more of the data strings and the PSRV. In one embodiment, the PSRV contains the data string read from each IBE bank (550, 552, 554, 556), and authentication may comprise considering IC 500 authenticated if a subset of data strings match the data strings in the PSRV 561. For example, IC 500 may be considered authenticated if any two data strings from the four IBE banks (550, 552, 554, 556) matches a data string stored in the PSRV 561. In this way, if a particular IBE bank has unreliable bits, it still does not prevent successful authentication. Due to the nature of the IBE, a copy of the IBE will not necessarily read the same way as an original. Hence, if the entire IC 500 is copied, the data strings from the one or more of the IBE banks (550, 552, 554, 556) will not match the PSRV 561, and authentication will fail, preventing operation of the counterfeit IC.

Another embodiment of the present invention comprises performing an initialization to identify don't-care bits. This approach addresses problems caused by the unreliability of IBE devices having a wide variability Vt device within region 444 (FIG. 4). The initialization comprises taking multiple readings of each IBE. The multiple readings take place over a range of reference voltages. For example, the voltage VDD may be adjusted over a range of 0.8 times the nominal VDD (relative value of 0.8) to 1.0 times the nominal VDD (relative value of 1.0), and a data string read at predetermined VDD voltage values. Any bits that flip (change state) during the multiple reads are deemed as unreliable and designated as don't-care bits.

FIG. 6 is a table 600 illustrating don't-care bits. Column 662 indicates a range of VDD voltages. Column 664 indicates a data string read from an IBE bank. Bit 666 is deemed a reliable bit, since its value consistently reads as "1" over the range of VDD voltages shown in column 662. Bit 668 is deemed as unreliable, since it transitions from a "0" at a VDD relative value of 0.8, to a "1" at a VDD relative value of 0.9. Hence, bit 670 is deemed to be a don't-care bit. Don't-care bits are indicated by an "x" in the final data string value displayed in row 672 of table 600. A bit mask representative of the don't-care bits may be stored within the PSRV, or in another non-volatile storage area. In this way, those bits may be ignored during a comparison. Alternatively, the don't-care bits may be treated as a defined state (e.g. a binary "0") for the purposes of encryption or performing data transformation such as with a one-way mathematical function.

FIG. 7 is a block diagram of a system 700 comprising a trusted server. System 700 comprises an IC 774 which comprises IBE bank 750 and CPU 758. The IC 774 communicates over a network 778 to a trusted server 776. In some embodiments, the network 778 may comprise the Internet. The trusted server 776 is a server established by a trusted entity, such as a chip manufacturer, and contains PSRV data for a plurality of ICs that it manufactures. When a user wishes to authenticate a particular sample of an IC, an authentication function is invoked within CPU 758. The CPU reads the data string from IBE bank 750 and submits it to trusted server 776. If trusted server 776 has the corresponding PSRV for the data string from IBE bank 750, then the trusted server 776 sends back an indication, such as a data packet, indicating successful authentication. The user then can have confidence that his sample of the IC is not counterfeit.

FIG. 8 is a flowchart 800 indicating process steps for an embodiment of the present invention. In process step 880, one or more IBE banks are configured. This may comprise asserting an enable signal (e.g. 125 of FIG. 1) for a predetermined time interval, and then de-asserting the enable signal. In process step 882, the data strings are retrieved (read) from the IBE banks. In process step 884, the data strings are compared with a previously stored related value. Process step 884 may include, but is not limited to, a simple comparison, a comparison of a subset of IBEs in a bank by utilizing don't-care bits, a comparison of a subset of IBE banks selected from a plurality of IBE banks, a comparison of an encrypted version of a data string with a PSRV, or a comparison of a PSRV with an output of a one-way mathematical function based on an input data string. If the comparison is deemed a match in process step 886, then, in response to the match between the generated data value string and the previously stored related value, the authentication is deemed as passed in process step 888, and the chip is classified as authentic. If the comparison is deemed to not match in process step 886, then the authentication is deemed as failed in process step 890 and the chip is classified as a failed unit.

As can now be appreciated, embodiments of the present invention provide for improved chip identification. Embodiments of the present invention provide an intrinsic bit element that comprises two transistors. The two transistors form a pair in which one transistor has a wide variability in threshold voltage and the other transistor has a narrow variability in threshold voltage. The wide variability is achieved by making a transistor with a smaller width and length than the other transistor in the pair. The two transistors may be configured in parallel with a difference detection circuit disposed between them. The variation of the threshold voltage of the wide variability transistor means that in the case of copies of IBEs being made, some of the "copied" wide variability transistors will have significantly different threshold voltages, causing some of the intrinsic bit elements of a copied chip to read differently than in the original chip from which they were copied. No additional components (e.g. a "noise element") are needed to induce the variability. In some embodiments, a pair of NFETs or a pair of PFETs may be used to form an intrinsic bit element. An initialization procedure may be used to identify one or more don't-care bits. The don't-care bits may be accounted for by storing a bit mask that is representative of the don't-care bits. In this way, reliable, repeatable (for a given physical IC), unique chip identification data strings may be achieved. It is very difficult to infer the state of a particular intrinsic bit element by visual inspection (e.g. a de-layering technique). In some embodiments, a maximum allowable number of don't-care bits may be established, such that if an IBE bank exceeds the predetermined limit of the maximum allowable number of don't-care bits, that particular IC is classified as a failed part during the manufacturing (or quality assurance) process. In some embodiments, capacitors may be employed in parallel with the transistors within an IBE to improve stability. Furthermore, in addition to variation in voltage threshold, the transistor width, length, and therefore the drive strength, may also vary as a result of process variations. These variations may also contribute to the determination of the value of an intrinsic bit element.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. An electronic circuit comprising:
a first transistor having a first threshold voltage standard deviation value;
a second transistor having a second threshold voltage standard deviation value; wherein:
the first transistor comprises a first endpoint node connected to a first voltage and a second endpoint node connected to a second voltage;
the second transistor comprises a first endpoint node connected to the first voltage and a second endpoint node connected to the second voltage;

an enable signal configured and disposed to control a gate of the first transistor and a gate of the second transistor; and a difference detection circuit disposed between the first endpoint node of the first transistor and the first endpoint node of the second transistor, wherein the difference detection circuit is configured and disposed to generate a signal indicative of a difference in threshold voltage between the first transistor and the second transistor;

wherein the first transistor has a channel width that is smaller than a channel width of the second transistor and wherein the first transistor has a channel length that is smaller than a channel length of the second transistor; and wherein a ratio of channel width to channel length of the first transistor is substantially equal to a ratio of channel width to channel length of the second transistor.

2. The circuit of claim 1, wherein the difference detection circuit comprises a cross-coupled inverter circuit.

3. The circuit of claim 1, wherein the difference detection circuit comprises a comparator circuit.

4. The circuit of claim 2, further comprising:
a first capacitor disposed between the first endpoint node of the first transistor and the second endpoint node of the first transistor; and
a second capacitor disposed between the first endpoint node of the second transistor and the second endpoint node of the second transistor.

5. The circuit of claim 1, wherein the first transistor has a threshold voltage standard deviation value that ranges from three to four times a threshold voltage standard deviation value of the second transistor.

6. An integrated circuit comprising:
a plurality of intrinsic bit elements, wherein each intrinsic bit element of the plurality of intrinsic bit elements comprises:
a first transistor having a first threshold voltage standard deviation value;
a second transistor having a second threshold voltage standard deviation value;
wherein the first transistor and second transistor are both NFET transistors or both PFET transistors;
the first transistor comprises a first endpoint node connected to a first voltage and a second endpoint node connected to a second voltage;
the second transistor comprises a first endpoint node connected to the first voltage and a second endpoint node connected to the second voltage;
an enable signal configured and disposed to control a gate of the first transistor and a gate of the second transistor; and
a difference detection circuit disposed between the first endpoint node of the first transistor and the first endpoint node of the second transistor, wherein the difference detection circuit is configured and disposed to generate a signal indicative of a difference in threshold voltage between the first transistor and the second transistor;
wherein for each intrinsic bit element; the first transistor has a channel width that is smaller than a channel width of the second transistor and the first transistor has a channel length that is smaller than a channel length of the second transistor; and a ratio of channel width to channel length of the first transistor is substantially equal to a ratio of channel width to channel length of the second transistor.

7. The integrated circuit of claim 6, wherein the difference detection circuit of each intrinsic bit element comprises a cross-coupled inverter circuit.

8. The integrated circuit of claim 6, wherein the difference detection circuit of each intrinsic bit element comprises a comparator circuit.

9. The integrated circuit of claim 7, wherein each intrinsic bit element further comprises a first capacitor disposed between the first endpoint node of the first transistor and the second endpoint node of the first transistor; and
a second capacitor disposed between the first endpoint node of the second transistor and the second endpoint node of the second transistor.

10. The integrated circuit of claim 6, wherein for each intrinsic bit element, the first transistor has a threshold voltage standard deviation value that ranges from three to four times a threshold voltage standard deviation value of the second transistor.

* * * * *